(12) United States Patent
Zidan

(10) Patent No.: US 11,740,031 B1
(45) Date of Patent: Aug. 29, 2023

(54) HIGH TEMPERATURE THERMOCHEMICAL ENERGY STORAGE MATERIALS

(71) Applicant: BATTELLE SAVANNAH RIVER ALLIANCE, LLC, Aiken, SC (US)

(72) Inventor: Ragaiy Zidan, Aiken, SC (US)

(73) Assignee: Battelle Savannah River Alliance, LLC, Aiken, SC (US)

( * ) Notice: Subject to any disclaimer, the term of this patent is extended or adjusted under 35 U.S.C. 154(b) by 5 days.

(21) Appl. No.: 17/686,568

(22) Filed: Mar. 4, 2022

(51) Int. Cl.
*F28D 20/00* (2006.01)
*C01D 15/08* (2006.01)
*B01J 8/24* (2006.01)
*C01D 7/00* (2006.01)

(52) U.S. Cl.
CPC ............ *F28D 20/0034* (2013.01); *B01J 8/24* (2013.01); *C01D 7/00* (2013.01); *C01D 15/08* (2013.01); *F28D 20/003* (2013.01); *B01J 2208/00194* (2013.01); *F28D 2020/0047* (2013.01)

(58) Field of Classification Search
CPC ... Y02E 60/14; F28D 20/003; F28D 20/0034; F28D 2020/0047; C09K 5/16
See application file for complete search history.

(56) References Cited

U.S. PATENT DOCUMENTS

| 4,192,371 A * | 3/1980 | Derouette ............... F24V 30/00 48/209 |
| 4,421,661 A | 12/1983 | Claar et al. |
| 7,971,437 B2 | 7/2011 | Flynn et al. |
| 10,254,012 B2 | 4/2019 | Choi |
| 2008/0289793 A1 | 11/2008 | Geiken et al. |
| 2011/0017196 A1 | 1/2011 | Bell et al. |
| 2017/0362090 A1 * | 12/2017 | Melsert ................... C01B 32/50 |
| 2020/0094184 A1 | 3/2020 | Muto |

FOREIGN PATENT DOCUMENTS

| CN | 105542726 | 5/2016 |
| CN | 108017403 | 5/2018 |
| CN | 108675822 | 10/2018 |
| CN | 111139037 | 5/2020 |

(Continued)

OTHER PUBLICATIONS

Barker, R. "The reactivity of calcium oxide towards carbon dioxide and its use for energy storage" *J. Appl. Chem. Biotechn.* 24 (1974) pp. 221-227.

(Continued)

*Primary Examiner* — Eric S Ruppert
(74) *Attorney, Agent, or Firm* — Dority & Manning, P.A.

(57) ABSTRACT

Disclosed are thermal energy storage systems and methods that utilize metal carbonate eutectics that can undergo high temperature reversible reactions to form mixtures of metal oxides. The metal oxides undergo an exothermic reaction with carbon dioxide to form the molten metal carbonate eutectics, and the molten metal carbonate eutectics undergo an endothermic decarbonization reaction to form the metal oxides and carbon dioxide. By carrying out the reversible reactions at a temperature above the melting point of the carbonate eutectic, the systems provide high thermal conductivity and reversible stability for thermal energy storage.

20 Claims, 6 Drawing Sheets

(56) References Cited

FOREIGN PATENT DOCUMENTS

| JP | S54058247 A | * | 5/1979 |
| WO | WO 2012/130285 | | 10/2012 |

OTHER PUBLICATIONS

Barker, R. "The reversibility of the reaction $CaCO_3 \leftrightarrows CaO+CO_2$" *J. Appl. Chem. Biotechn.* 23 (1973) pp. 733-742.

Cassir, et al. "Effect of $CO_2$ and melt decarbonation on the dimerization of methane in molten $Li_2CO_3$—$Na_2CO_3$—$K2CO_3$ supported by $LiAlO_2$ or $Li_2TiO_3$ at 750-850° C." *Cataly. Lett.* 35 (1995) pp. 45-56.

Chen, et al. "Coupled Experimental Study and Thermodynamic Modeling of Melting Point and Thermal Stability of $Li_2CO_3$—$Na_2CO_3$—$K2C)_3$ Based Salts" *J. Solar Ener. Eng.* 136:031017 (2014) pp. 1-7.

Chowdhury, et al. "$CO_2$ capture with a novel solid fluidizable sorbent: Thermodynamics and Temperature Programmed Carbonation-Decarbonation" *Chem. Eng. J.* 232 (2013) pp. 139-148.

Corgnale, et al. "Screening analysis of metal hydride based thermal energy storage systems for concentrating solar power plants" *Ren. Sust. Energy Rev.* 38 (2014) pp. 821-833.

Frangini, et al. "Thermal stability and oxidizing properties of mixed alkaline earth-alkali molten carbonates: a focus on the lithium-sodium carbonate eutectic system with magnesium additions" *Therma. Acta* 574 (2013) pp. 55-62.

Gil, et al. "State of the art on high temperature thermal energy storage for power generation. Part 1—Concepts, materials and modellization" *Renew. Sust. Energy Rev.* 14 (2010) pp. 31-55.

Janz, et al. "Solid-Liquid Phase Equilibria for Mixtures of Lithium, Sodium, and Potassium Carbonates" *J. Chem. Eng. Data* 6 (1961) pp. 321-323.

Kolb, et al. "Power Tower Technology Roadmap and Cost Reduction Plan" *Sandia Nat'l Lab.* SAND2011-2419 (2011) pp. 1-38.

Kyaw, et al. "Study of carbonation reactions of Ca—Mg oxides for high temperature energy storage and heat transformation" *J. Chem. Eng. Jpn.* 29 (1996) pp. 112-118.

Kyaw, et al. "Applicability of carbonation/decarbonation reactions to high-temperature thermal energy storage and temperature upgrading" *J. Chem. Eng. Jpn.* 29 (1996) pp. 119-125.

Medrano, et al. "State of the art on high-temperature thermal energy storage for power generation. Part 2—Case studies" *Renew. Sust. Energy Rev.* 14 (2010) pp. 56-72.

Olivares, et al. "The Thermal Stability of Molten Lithium-Sodium-Potassium Carbonate and the Influence of Additives on the Melting Point" *J. Solar Ener. Eng.* 134:041002 (2012) pp. 1-8.

Petri, et al. "High-Temperature Molten Salt Thermal Energy Storage Systems for Solar Applications" *Inst. Gas Tech./NASA* DEN3-156 (1980) pp. 183-189.

Ren, et al. "Experimental study on optimized composition of mixed carbonate for phase change thermal storage in solar thermal power plant" *J. Therm. Anal. Calorim.* 104 (2011) pp. 1201-1208.

Shin, et al. "Ternary carbonate eutectic (lithium, sodium and potassium carbonates) for latent heat storage medium" *Solar Ener. Mater.* 21 (1990) pp. 81-90.

Sullivan, S. "SunShot APOLLO Project: Solar Receiver with Integrated Thermal Storage for a Supercritical Carbon Dioxide Power Cycle" *US Dept. Energy* DE-EE0007118 (2019) pp. 1-26.

Ward, et al. "High temperature thermal energy storage in the CaAl2 system" *J. Alloys Compounds* 735 (2018) pp. 2611-2615.

Wu, et al. "Experimental study on optimized composition of mixed carbonate salt for sensible heat storage in solar thermal power plant" *Solar Ener.* 85 (2011) pp. 1957-1966.

Yu, et al. "Experimental study on optimized composition of mixed carbonate salt for sensible heat storage in solar thermal power plant" *Solar Energy* 85 (2011) pp. 1957-1966.

\* cited by examiner

HIGH TEMPERATURE THERMOCHEMICAL ENERGY STORAGE MATERIALS

STATEMENT REGARDING FEDERALLY SPONSORED RESEARCH OR DEVELOPMENT

This invention was made with government support under Contract No. 89303321CEM000080, awarded by the United States Department of Energy. The government has certain rights in the invention.

BACKGROUND

Efficient energy storage is necessary in order to effectively utilize renewable energy sources. Thermal energy storage systems are those that can store excess thermal energy for use at a later time and are of particular interest in solar systems. Thermal energy storage systems typically utilize one of three different approaches, including sensible heat materials, latent heat materials, and thermochemical materials. Sensible heat materials store thermal energy based on their heat capacity and have the lowest thermal energy density of the three classes. Sensible heat materials include molten salts, various oils, and solids, such as building materials, e.g., fabrics, metals, brick, etc. Latent heat materials have a high enthalpy associated with a phase change and have been gaining attention for thermal energy storage applications. Latent heat phase change materials of interest include organics (e.g., paraffin waxes, fatty acids, glycols), salt hydrates, metals, metal alloys, and carbonate eutectics. Thermochemical heat materials store thermal energy by use of a reversible thermochemical reaction. At high energy input, an endothermic reaction takes place, effectively storing energy in the chemical bonds formed during the reaction. The reaction products are stored separately and later recombined in an exothermic reaction to release the stored energy. While sensible and latent heat materials are still the most common thermal energy storage materials (primarily molten salts), the achievable energy densities and heat storage periods for these materials are far less than those of thermochemical energy storage materials.

Molten carbonate eutectic technology has previously been utilized for heat storage primarily using phase transformation of the molten salts. Unfortunately, low energy densities possible with this approach has led to little adoption of carbonate eutectic materials in such applications. Previous attempts have also been made for utilization of carbonates in powder form as thermochemical heat storage materials. Unfortunately, such attempts have met with problems and drawbacks including agglomeration and sintering of the powders with system cycling, slow gas diffusion and reactivity of the powdered materials, partial reaction, loss of energy density due to limited reacting surface area, and poor heat conductivity. For instance, in previous work with powdered carbonates, the thermochemical conversion did not exceed a 60% efficiency value and the reaction could not be sustained over even two cycles because of sintering, even when a rotating cylinder was utilized. In order to achieve a higher conversion, smaller particles were used, causing volumetric density to be reduced to 10% of the theoretical and this approach also failed to be sustained over multiple cycles due to particle sintering. (See, e.g., J Appl Chem Biotechnol 1973; 23:733-42, J Appl Chem Biotechnol 1974; 24:221-7).

What are needed in the art are thermochemical energy storage materials that are cost effective and that overcome previous issues with previously known materials while displaying efficient and reversible energy storage reactions at high temperatures.

SUMMARY

Disclosed is a thermochemical energy system that includes a first metal and a second metal, optionally in conjunction with one or more additional metals. The metals are configured to form a molten metal carbonate eutectic according to a first reaction and are configured to form a mixture of metal oxides according to a second reaction. A system can also include a carbon dioxide component that is configured to deliver carbon dioxide to the mixture of metal oxides and thereby generate/maintain the first reaction. The carbon dioxide component is also configured to remove carbon dioxide from the mixture of metal oxides and thereby generate/maintain the second reaction. A system can also include a heat transfer component that is configured to deliver thermal energy to the molten metal carbonate eutectic and thereby generate/maintain the second reaction and that is also configured to remove thermal energy generated during the first reaction.

Also disclosed is a method for storing and releasing thermal energy. A method can include adding thermal energy to a metal carbonate eutectic to form a molten metal carbonate eutectic. Upon the formation of the molten eutectic, and at the conditions of the molten eutectic, the molten metal carbonate eutectic can react to form carbon dioxide and a mixture of metal oxides. The method also includes maintaining the partial pressure of the carbon dioxide thus formed over the molten metal carbonate eutectic at a pressure that is equal to or lower than an equilibrium pressure of the carbon dioxide. In order to maintain the partial pressure of the carbon dioxide at the targeted low partial pressure, at least a portion of the carbon dioxide formed during the reaction can be removed from the reaction area. At a later time, carbon dioxide can be re-introduced to the area, and the mixture of metal oxides can react with the carbon dioxide according to an exothermic reaction that reforms the molten metal carbonate eutectic. The method can also include recovering thermal energy produced in the exothermic reaction. Upon conversion to the metal eutectic and recovery of the thermal energy, the metal eutectic can be stored as a solid at a lower temperature (e.g., ambient) until the cycle is carried out again.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which.

Figure 1:
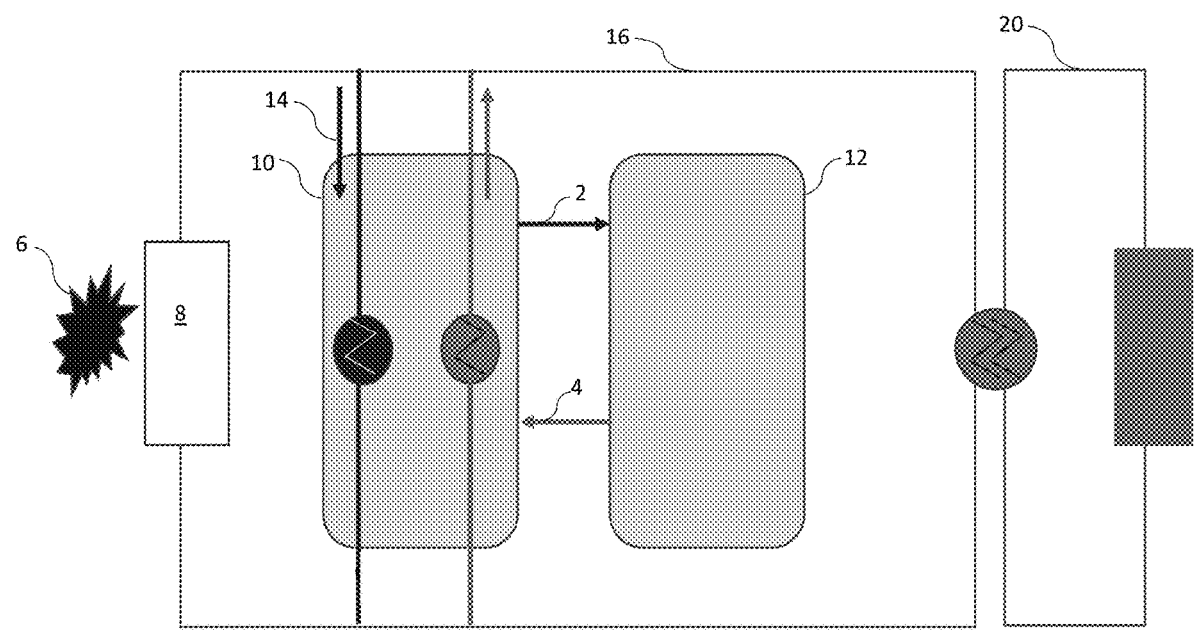
FIG. 1 schematically illustrates a simplified diagram of a molten metal carbonate eutectic-based thermal energy storage system.

Repeat use of reference characters in the present specification and drawings is intended to represent the same or analogous features or elements of the present invention.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

In general, disclosed are thermochemical energy storage systems and methods that incorporate high enthalpy carbonate-based materials that can exhibit high thermal conductivity at high temperature reaction conditions. More specifically, disclosed systems incorporate carbonate-based thermochemical heat materials that include two or more metals that can form a molten metal carbonate eutectic from the metal oxides when reacted with carbon dioxide according to an exothermic reaction and can reversibly reform the metal oxides from the molten metal carbonate eutectic according to an endothermic reaction.

Disclosed methods and systems utilize the thermochemical heat storage capability of carbonate eutectics and thereby differ from previous systems which utilized such materials only as latent heat storage materials that take advantage of energy differences upon phase transformation. Moreover, disclosed methods utilize the carbonate eutectic materials in the liquid phase above the melting temperature of the eutectic and as such, have solved issues previously encountered in which attempts were made to utilize eutectic materials in thermochemical applications in the solid state as powders.

Through use of the molten metal carbonate eutectics, disclosed systems can take advantage of the low cost and safety of carbonate-based materials while benefiting from the high energy density of the materials (e.g., over 690 kWh/m³) to achieve low cost and highly efficient heat storage. For instance, carbonate-based system reactions demonstrate very high enthalpies (up to 178 kJ/mol), and the thermochemical energy densities of carbonates can be from about 5 to about 10 times greater than latent and sensible heat storage systems. Moreover, the systems can operate at very high temperatures (e.g., greater than about 800° C.) and over a wide range (e.g., from about 850° C. to about 1500° C.) useful for many high temperature applications. Additionally, as the components are safe, well-known, and not subject to oxidation, with no by-products formed in the reversible reactions, the materials can be handled safely in air for easy storage and transportation.

As the components of the system can be stored at ambient temperature for a virtually unlimited period of time, disclosed systems can also provide energy storage with no thermal energy loss during the storage period. For instance, the methods and systems can allow for long-term storage of components, e.g., weekly, seasonal, etc., and as such, can enable thermal energy storage applications not previously considered possible. In one embodiment, disclosed methods can be beneficial for use in thermal storage power-peaking applications, e.g., in concentrated solar power systems that can provide long-term energy storage until required.

One embodiment of a carbonate-based eutectic system is illustrated in FIG. 1. As illustrated, a system can include a reactor component 10 and a carbon dioxide storage component 12. The reactor component can contain the oxides and carbonates of the reversible reaction process.

The individual metals for use in the systems are not particularly limited, provided that they are capable of reversibly forming a molten metal carbonate eutectic and metal oxides according to the general carbonate reaction:

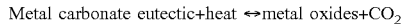

Metal carbonate eutectic+heat ↔ metal oxides+CO$_2$

Figure 2:
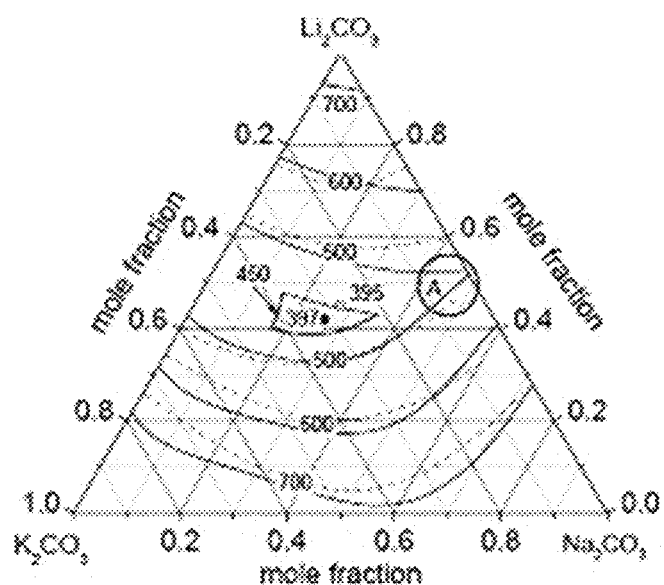
FIG. 2 presents a phase diagram of an exemplary eutectic system incorporating lithium, sodium, and potassium carbonates.

By way of example, FIG. 2 illustrates a phase diagram for a ternary eutectic (MiCO$_3$) lithium/sodium/potassium carbonate system as may be utilized, but other metal carbonate eutectic systems may alternatively be utilized, such as, and without limitation to, calcium carbonate and/or magnesium carbonate-based systems. Moreover, while the system of FIG. 2 is a ternary system, binary as well as higher content systems are also encompassed herein. As indicated in FIG. 2, through modification of the mole fraction of each component of the eutectic system, the melting point of the eutectic can be modified, which can allow for a wide range of operating temperatures for a system. For example, through modification of the ratio of components, a ternary system can be modified to operate at a temperature of about 850° C. or higher, as may be useful in operation of a Stirling engine, or at a higher temperature of about 1000° C. or even higher, as may be required for a solar hydrogen storage operation.

As indicated in FIG. 1, the carbon dioxide storage component 12 allows for carbon dioxide to be removed from 2 or added to 4, the reactor component. The methods and materials utilized to move and store the carbon dioxide are not particularly limited. Beneficially, as carbon dioxide is non-filmable with no embrittlement effect on storage containers, it can be easily stored in either liquid or gas form. By way of example, a compressor system can be utilized to remove and compress the carbon dioxide so as to provide a high-density liquid carbon dioxide for storage.

In operation of a system, when a thermal heat source 6 is available, thermal energy 14 can be provided to the reactor system. Depending upon the heat source and the system, a portion of the thermal energy available can also be sent 16 to a power component 20, for instance, to produce electricity. In one embodiment, the system can be a solar-based system, and solar energy that impacts a solar concentrator 8 can provide the thermal energy 14, 16 input to the system. However, disclosed systems are not limited to solar-based systems, and other periodic heat sources are encompassed herein, e.g., waste heat from an industrial process, other periodic natural heat sources, etc.

The thermal energy 14 input to the reactor component 10 can increase the temperature of the metal carbonate eutectic held therein to a temperature above the melting point of the eutectic and can encourage the endothermic decomposition reaction of the molten carbonate eutectic to form carbon dioxide and the metal oxides. As carbon dioxide is formed in the decomposition reaction, the partial pressure of the carbon dioxide can be controlled (via removal of excess carbon dioxide 2) to maintain the partial pressure of the carbon dioxide below the equilibrium pressure. For instance, the partial pressure of carbon dioxide during the reaction can be maintained at about 10 bar or less, about 8 bar or less, or about 6 bar or less, such as from about to about 8 bar, or about 3 bar to about 6 bar, in some embodiments. The carbon dioxide partial pressure and the temperature within the reactor system 10 can thus drive and control the decarbonization reaction.

Because the decarbonization reaction is carried out in above the melting point of the metal carbonate eutectic, the components of the reversible reactions, including the molten metal carbonate eutectic, solid metal oxides, and gaseous carbon dioxide, will self-separate in the reactor. This self-separation can prevent agglomeration and sintering issues as found in previous thermochemical carbonate processes, particularly as the molten carbonate eutectic and the metal oxides are in different phases. In some embodiments, a stirring mechanism can also be employed within the reactor component 10 to further encourage the self-separation of the components.

At a later time, when thermal energy is unavailable and desired, carbon dioxide can be provided 4 to the reactor component 10, which now contains the previously formed metal oxides. The resulting exothermic carbonate eutectic forming reaction can provide thermal energy 16 to the power system 20.

The rate of addition of the carbon dioxide to the reactor component can be utilized to control the heat generation of the resulting exothermic reaction. The reaction conditions can be controlled such that the reactor component 10 is maintained at a temperature above the melting point of the carbonate eutectic while providing a controllable amount of excess thermal energy 16. At the operating conditions, the eutectic carbonate will melt as it forms, and the separation of the product molten metal carbonate eutectic from the solid metal oxides can spontaneously take place. In addition, as carbon dioxide has a high solubility in molten metal carbonate eutectic, the added carbon dioxide can diffuse through the molten eutectic and react at the surface of the solid metal oxides.

In some embodiments, the reactor component 10 can be operated as a fluidized bed established between the molten metal carbonate eutectic and the solid metal oxides. Fluidized bed reaction conditions can achieve a higher heat conductivity in the reactor component. In some embodiments, the added carbon dioxide can be fed to the bottom of the bed of the reactor component 10, thereby encouraging both fluidization of the bed and high surface area contact with the metal oxides. By use of an inert carrier gas, the partial pressure of the carbon dioxide within the reactor component 10, and thus the exothermic reaction, can be controlled while also maintaining the fluidization characteristics of the bed.

The thermochemical energy storage system can transfer thermal energy to and from the reactor component according to any suitable approach. By way of example, in one embodiment, a system can include a shell and tube heat exchanger as is generally known in the art. A heat transfer fluid, e.g., a heat transfer oil or the like, can flow inside or outside of the tubes, and the thermochemical energy storage materials, including the metal carbonate eutectic/metal oxide reversible reaction components as described herein, can be packed around the outside or the inside of the tubes (opposite to the heat transfer fluid), with a carbon dioxide control and flow systems in communication with the other reaction components.

In one embodiment, a thermochemical energy storage system can include one or more additives. For instance, a thermochemical energy storage system can include a carbon-based thermal conductivity modulator, such as carbon black and/or carbon nanoparticles and/or a catalyst for the reversible carbonate reaction. Catalysts can include, for example, a metal hydroxide such as sodium hydroxide or potassium hydroxide. Carbon nanoparticles can include, without limitation, carbon nanotubes and/or graphene. In one embodiment, a thermochemical energy system can include an ionic liquid as a thermal conductivity modulator. In one embodiment, a thermochemical energy storage system can include a graphitic carbon, for instance, a graphitic matrix structure, e.g., a graphite foam, or an expanded graphite, e.g., an expanded natural graphite. For example, a graphite foil of the trademark SIGRAFLEX®, material type L30010C can be used.

Beneficially, the high efficiency and low corrosive components of the system can provide for high performance and long cycle life of a system. For a thermal energy storage system to operate for a lifetime of about 30 years, it is estimated that the energy storage materials must be able to cycle approximately 11,000 times with low degradation over these cycles. Thus, the reversibility of an energy storage material over extended cycling is of great importance in thermal energy storage applications. Disclosed energy storage materials and systems can exhibit high stability for such long-life applications.

Disclosed systems and methods can achieve high exergetic efficiency, e.g., on the order of about 90% or greater, such as from about 93% to about 95% in some embodiments. As such, the methods and systems can provide very cost-effective thermal storage. For example, disclosed methods can meet or exceed energy cost goals for renewable energy of 3 cents per kilowatt hour (the 2030 goal of the US Department of Energy SunShot Initiative).

The present disclosure may be better understood with reference to the Examples set forth below.

EXAMPLE

A mixture of lithium, sodium, and potassium oxides ($Li_2O$, $Na_2O$, $K_2CO_3$, respectively) in a eutectic mixture ratio was placed in a Parr reactor. The mixture included 32.1 wt. % lithium carbonate, 34.5 wt. % sodium carbonate, and 33.4 wt. % potassium carbonate with a total amount of the carbonate mixture of 40.78 grams. The mixture was heated to the selected reaction temperature (450° C., 500° C., 600° C., 700° C.) and pressurized to 75 psi $CO_2$. Upon pressurization, the temperature spiked and the pressure dropped. Pressurization of $CO_2$, temperature spiking, followed by drop in pressure, was repeated several times until no more pressure drop occurred.

Figure 3:
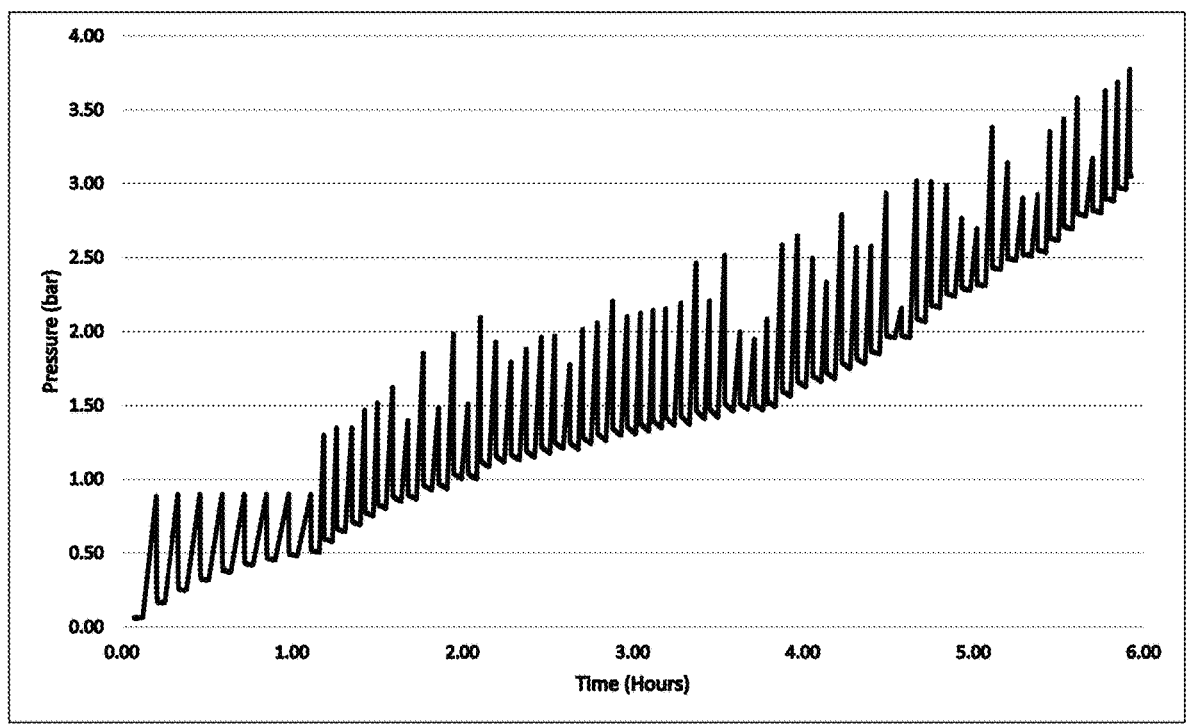
FIG. 3 illustrates carbon dioxide uptake by an oxides mixture and resulting carbonate conversion upon multiple carbon dioxide injections at a 450° C. operating temperature.
Figure 4:
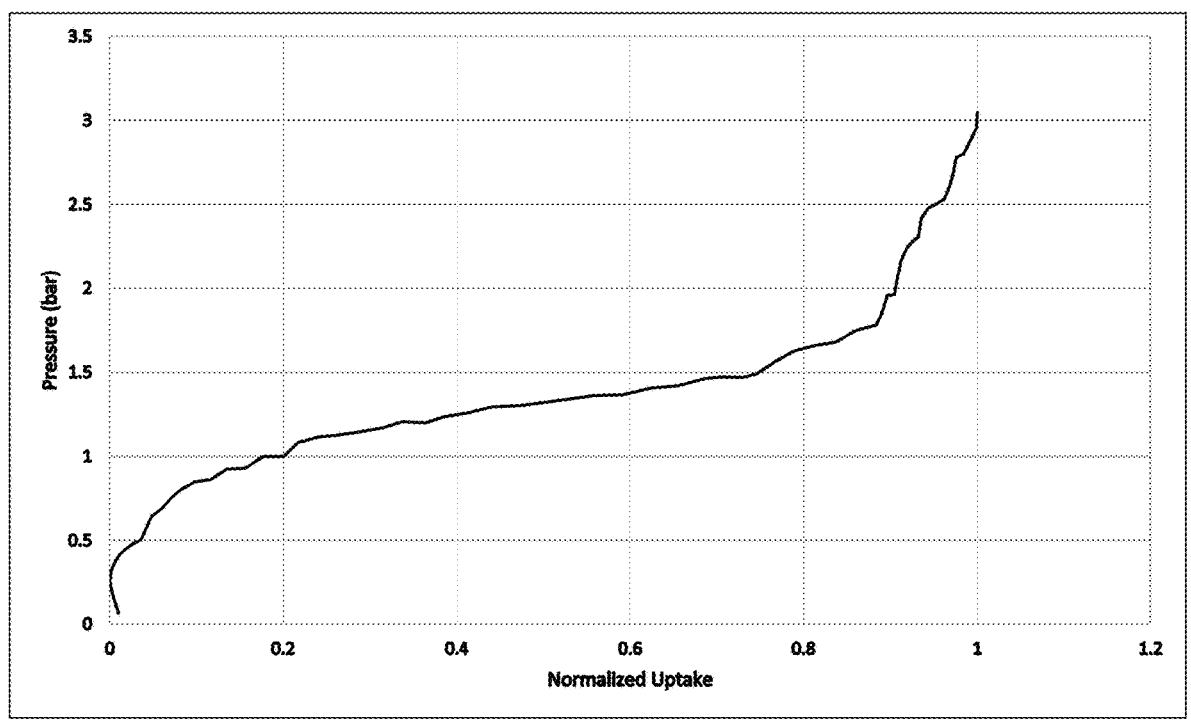
FIG. 4 illustrates the pressure vs. normalized uptake of carbon dioxide at a 450° C. operating temperature and demonstrating a single-phase oxide/carbonate transition.

The results for the sample run at 450° C. are shown in FIG. 3. In the first spike, the pressure dropped to 13 psi and the temperature spiked to 520° C. At the end of this sample, 6.074 g of mass was gained by the reactants, which indicated 87% conversion to the respective carbonates. The product became a solid piece, indicating that it was melted and was melted well below the melting point of any of the individual components of the eutectic mixture. FIG. 4 illustrates the normalized absorbance of $CO_2$ by the system as the oxides were converted to the carbonate eutectic at the 450° C. operating temperature. As indicated, the carbonate eutectic formation was a single-phase transition.

Figure 5:
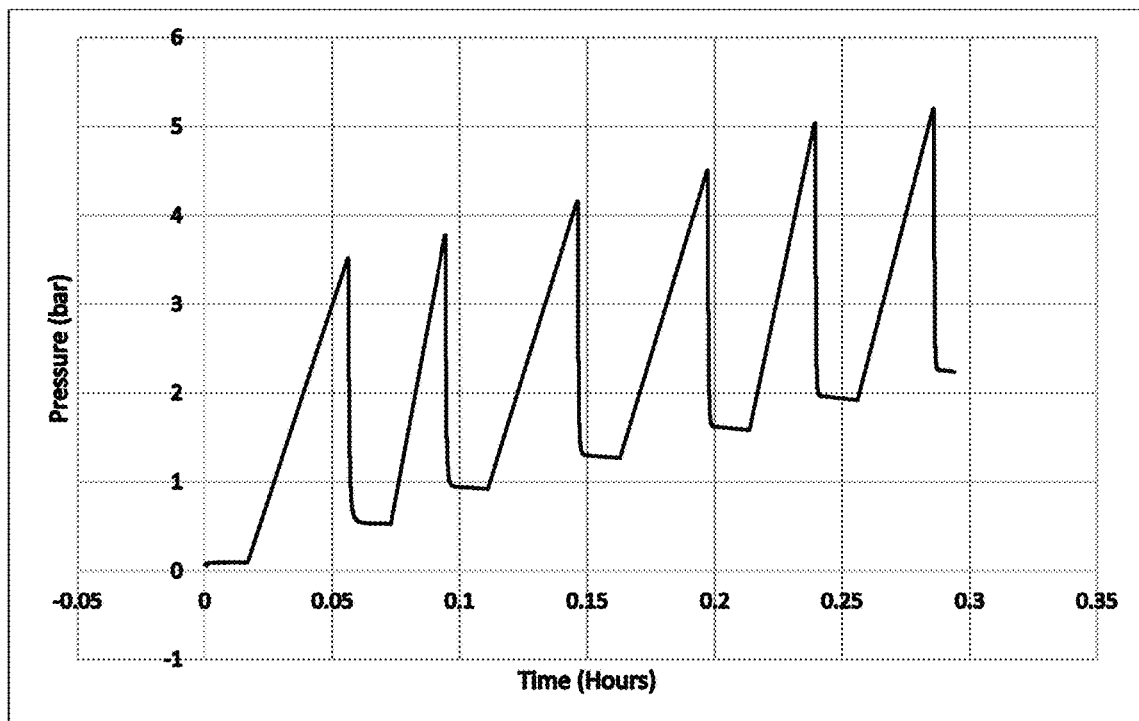
FIG. 5 illustrates carbon dioxide uptake by an oxides mixture and resulting carbonate conversion upon multiple carbon dioxide injections at a 500° C. operating temperature.
Figure 6:
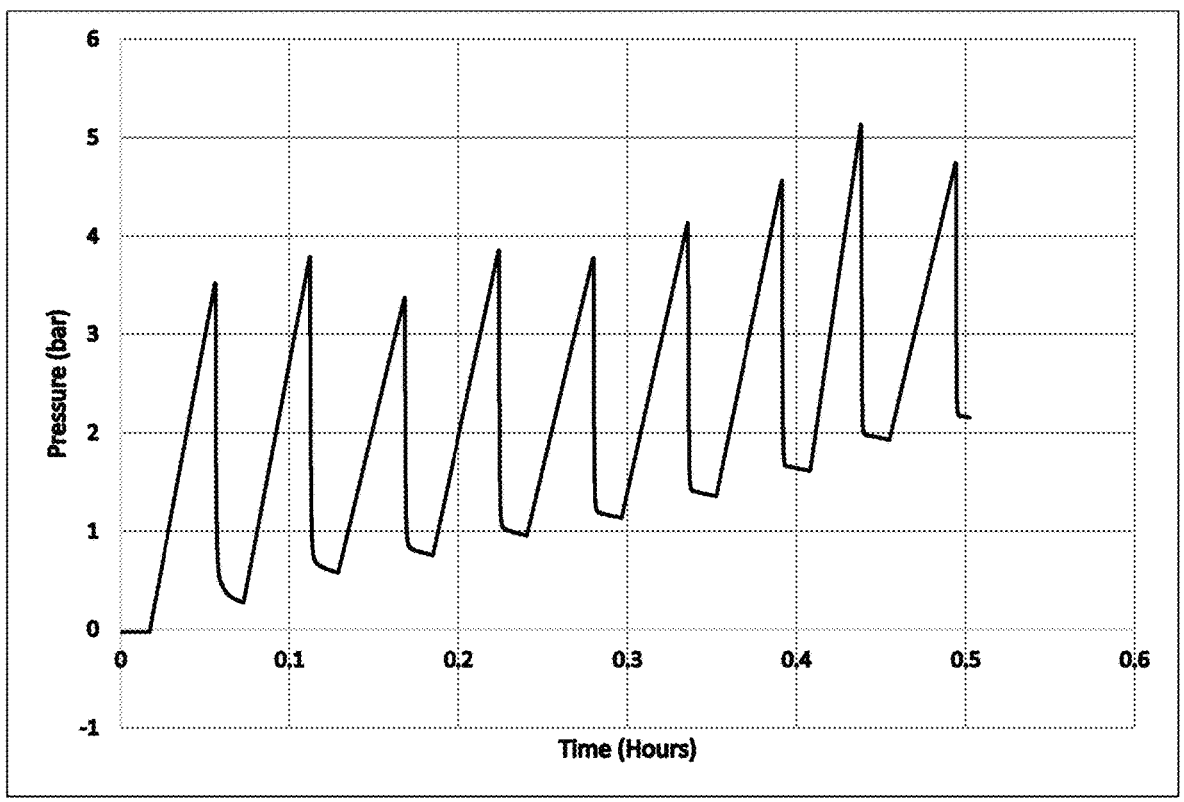
FIG. 6 illustrates carbon dioxide uptake by an oxides mixture and resulting carbonate conversion upon multiple carbon dioxide injections at a 600° C. operating temperature.
Figure 7:
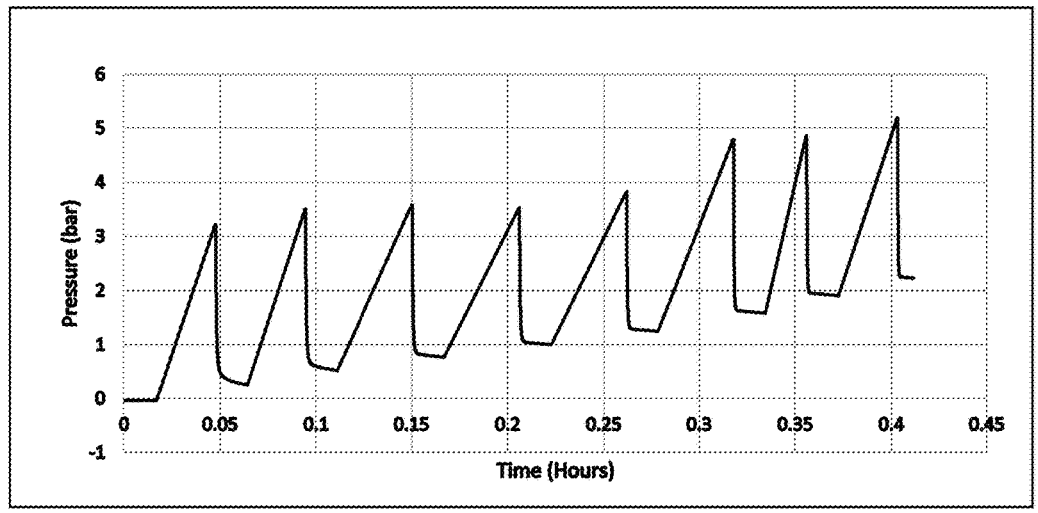
FIG. 7 illustrates carbon dioxide uptake by an oxides mixture and resulting carbonate conversion upon multiple carbon dioxide injections at a 700° C. operating temperature.
Figure 8:
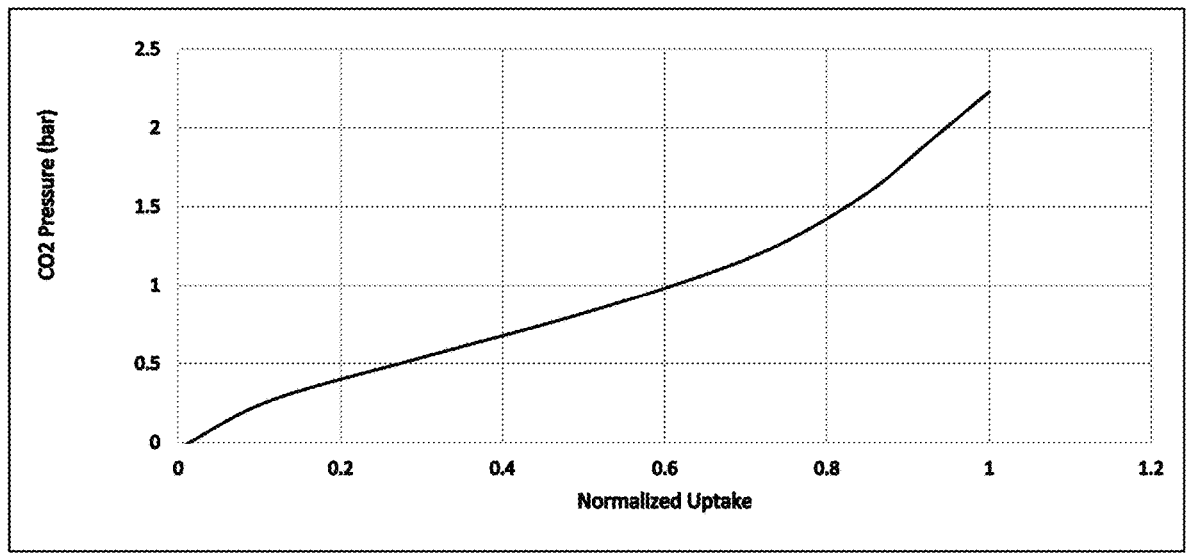
FIG. 8 illustrates the pressure vs. normalized uptake of carbon dioxide at a 700° C. operating temperature and demonstrating a single-phase oxide/carbonate transition.

FIG. 5 illustrates the system for a sample run at 500° C., FIG. 6 illustrates the system for a sample run at 600° C., and FIG. 7 illustrates the system for a sample run at 700° C. FIG. 8 illustrates the normalized absorbance of $CO_2$ by the system as the oxides were converted to the carbonate eutectic at the 700° C. operating temperature. As indicated, the carbonate eutectic formation was a single-phase transition.

It was concluded that as the oxide mixture became the carbonate eutectic, the transition began locally to form a eutectic molten liquid that absorbed and dissolved more carbon dioxide, which interacted with more metal oxide to form more carbonate, etc.

Figure 9:
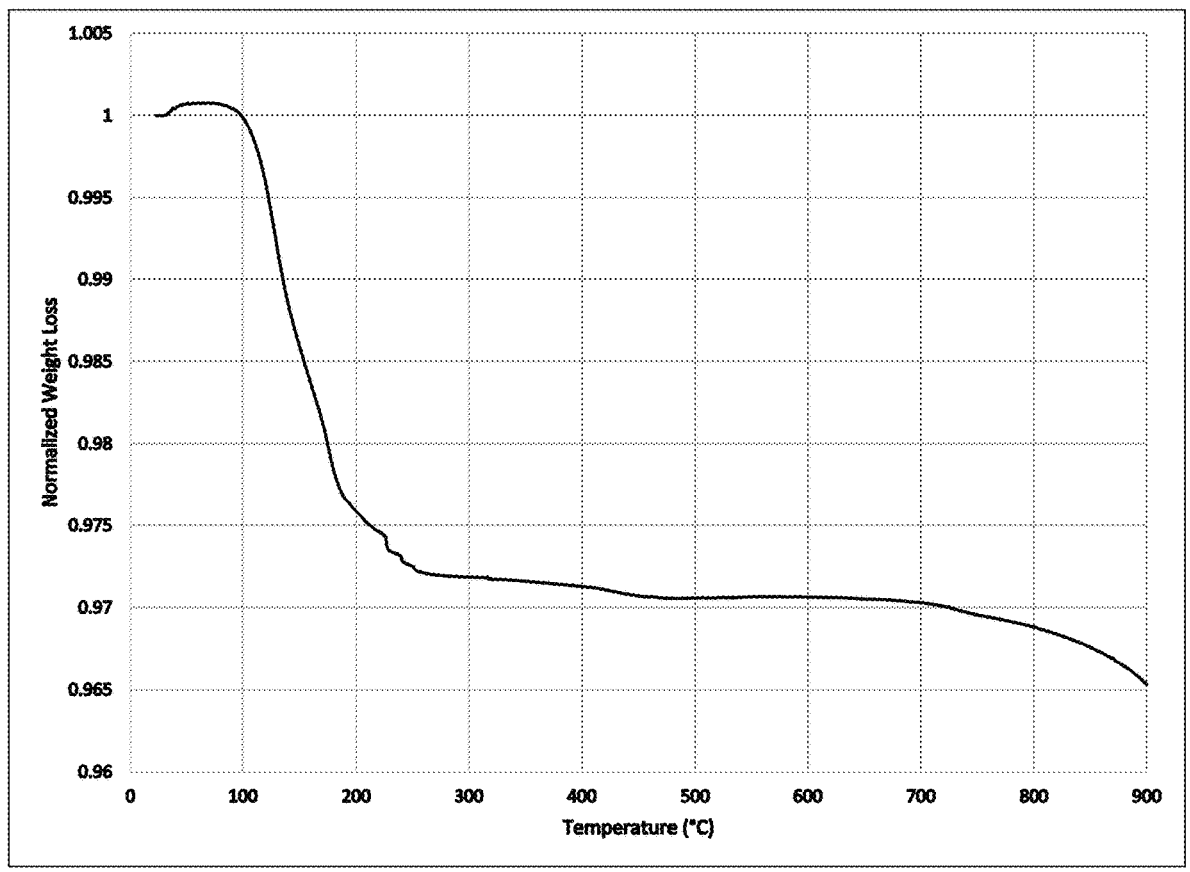
FIG. 9 illustrates desorption from a carbonate eutectic as a function of temperatures for a Li/Na/K carbonate eutectic.

FIG. 9 illustrates desorption of carbon dioxide from a carbonate eutectic system as a function of temperature, as the carbonate eutectic reacts to form carbon dioxide and the mixture of metal oxides.

While certain embodiments of the disclosed subject matter have been described using specific terms, such description is for illustrative purposes only, and it is to be understood that changes and variations may be made without departing from the spirit or scope of the subject matter.

What is claimed is:

1. A thermochemical energy system comprising:
   a first metal and a second metal, the first and second metal being configured to form a molten metal carbonate eutectic according to a first reaction and to form a mixture of metal oxides according to a second reaction;
   a carbon dioxide component configured to deliver carbon dioxide to the mixture of metal oxides and thereby generate or maintain the first reaction, and configured to remove carbon dioxide from the mixture of metal oxides and thereby generate or maintain the second reaction; and
   a heat transfer component configured to deliver thermal energy to the molten metal carbonate eutectic and thereby generate or maintain the second reaction, and configured to remove thermal energy generated during the first reaction.

2. The system of claim 1, further comprising a third metal.

3. The system of claim 2, the first metal comprising lithium, the second metal comprising sodium, and the third metal comprising potassium.

4. The system of claim 1, the carbon dioxide component comprising a compressor.

5. The system of claim 4, the carbon dioxide component comprising a liquid carbon dioxide storage.

6. The system of claim 1, the carbon dioxide component comprising a gaseous carbon dioxide storage.

7. The system of claim 1, the system further comprising an electricity production component.

8. The system of claim 1, the heat transfer component comprising a solar concentrator.

9. The system of claim 1, wherein the first and second metals are contained within a bed, wherein the bed is configured to operate as a fluidized bed during the first reaction and during the second reaction.

10. The system of claim 1, the heat transfer component comprising a shell and tube heat exchanger.

11. The system of claim 1, further comprising a thermal conductivity modulator and/or a catalyst in conjunction with the first metal and the second metal.

12. A method for storing and releasing thermal energy, comprising:
    adding thermal energy to a metal carbonate eutectic and thereby forming a molten metal carbonate eutectic, wherein upon the formation, the molten metal carbonate eutectic reacts according to a first reaction to form carbon dioxide and a mixture of metal oxides,
    maintaining a partial pressure of the carbon dioxide over the molten metal carbonate eutectic at a pressure that is equal to or lower than an equilibrium pressure of the carbon dioxide, wherein the maintaining comprises removal of at least a portion of the carbon dioxide formed in the first reaction;
    at a later time, combining carbon dioxide with the mixture of metal oxides, wherein upon the combination, the carbon dioxide and the mixture of metal oxides react according to a second reaction to reform the molten metal carbonate eutectic; and
    recovering thermal energy produced by the second reaction.

13. The method of claim 12, further comprising cooling the molten metal carbonate eutectic formed in the second reaction and thereby solidifying the metal carbonate eutectic, and storing the metal carbonate eutectic for a period of time prior to repeating the method of claim 12.

14. The method of claim 12, wherein the first reaction and the second reaction are each independently carried out at a temperature that is about 800° C. or greater.

15. The method of claim 12, wherein the first reaction and the second reaction are each independently carried out at a temperature of from about 850° C. to about 1500° C.

16. The method of claim 12, further comprising storing the removed carbon dioxide for the period of time followed by reintroduction of the carbon dioxide to the mixture of metal oxides.

17. The method of claim 16, wherein the carbon dioxide is stored as a liquid.

18. The method of claim 16, wherein the carbon dioxide is stored as a gas.

19. The method of claim 12, further comprising utilizing the recovered thermal energy in an electricity production process.

20. The method of claim 12, further comprising fluidizing the molten metal carbonate eutectic and mixture of metal oxides during the first reaction and during the second reaction.

* * * * *